United States Patent
Ziegler et al.

[11] Patent Number: 6,045,478
[45] Date of Patent: Apr. 4, 2000

[54] MODULAR TRANSMISSION UNIT

[76] Inventors: Rolf Ziegler, C/Enric Borras, 08330 Premia de Mar, Spain; Dieter Ebert, Richard-Wagner-Strasse 54, 69259 Wilhelmsfeld, Germany

[21] Appl. No.: 09/151,144

[22] Filed: Sep. 10, 1998

[30] Foreign Application Priority Data

Sep. 15, 1997 [DE] Germany .............. 197 40 552

[51] Int. Cl.[7] .................................................. F16H 3/00
[52] U.S. Cl. .................. 475/219; 475/207; 74/606 R
[58] Field of Search ................................ 475/207, 252, 475/219; 74/606 R

[56] References Cited

U.S. PATENT DOCUMENTS

| | | | |
|---|---|---|---|
| 3,473,414 | 10/1969 | Shacter | 74/606 R X |
| 4,431,073 | 2/1984 | Nagao et al. | 74/606 R X |
| 5,823,907 | 10/1998 | Teraoka et al. | 74/606 R X |

FOREIGN PATENT DOCUMENTS

| | | |
|---|---|---|
| 0 728 963 A1 | 8/1996 | European Pat. Off. . |
| 489 766 | 2/1926 | Germany . |
| 2 310 927 | 10/1973 | Germany . |
| 3 140 330 C2 | 4/1983 | Germany . |
| 4 134 553 A1 | 3/1992 | Germany . |
| 07 310 808 | 11/1995 | Japan . |

Primary Examiner—Khoi Q. Ta
Attorney, Agent, or Firm—Pennie & Edmonds LLP

[57] ABSTRACT

The present invention refers to a transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage being replaceably inserted in a reception bore of the housing as a modular unit.

43 Claims, 6 Drawing Sheets

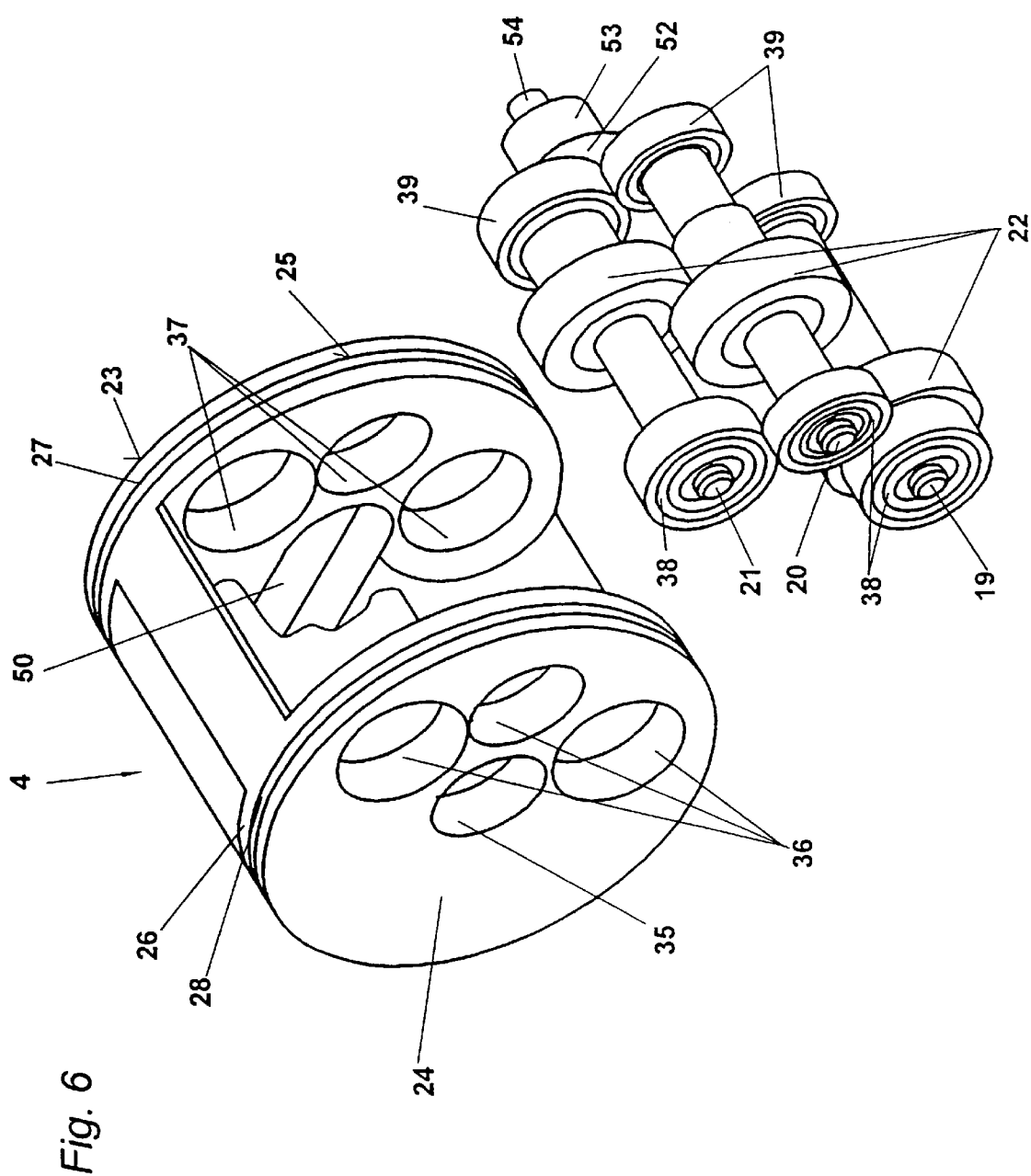

MODULAR TRANSMISSION UNIT

TECHNICAL FIELD

The present invention refers to a transmission unit.

BACKGROUND OF THE INVENTION

In particular in the field of servo-drive technology, transmissions with a very small amount of backlash and high rigidity under very high dynamic loading are demanded. In addition, a plurality of transmission possibilities is demanded in this field, and this results in a large number of different transmissions. This is the reason for the fact that these transmissions are not kept in store in most cases, but are made to order. Especially in the case of unusual transmission ratios, this may result in substantial waiting periods which entail various disadvantages. Due to the large number of different transmission possibilities, it has, up to now, been impossible to provide all the variants of one series of transmission within the shortest possible time.

It is therefore the object of the present invention to provide a transmission unit which permits a more flexible structural design with regard to various transmission possibilities.

SUMMARY OF THE INVENTION

According to the present invention, this object is achieved by a transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage being replaceably inserted in a reception bore of the housing as a modular unit.

It follows that the transmission unit has a structural design of such a nature that a generally fixed second main transmission stage is arranged within the transmission housing, which, due to the modular construction, can be preceded by a first main transmission stage in an arbitrary manner. For this purpose, it will only be necessary to standardize the transition between the first and the second main transmission stages, the first main transmission stage being capable of providing all possible transmission ratios. Due to the fact that the two main transmission stages are accommodated in a single housing, the transmission unit has a very compact structural design. The modular structural design is not visible. Because a single housing including an invariable second main transmission stage is provided, these components will remain the same for the whole transmission unit series and only the respective first main transmission stage will be varied. This can be integrated in the sequence of production steps much more easily than the production of a complete transmission that is adapted to the respective transmission ratio. Due to the fact that the gear/shaft carrier is inserted in a reception bore of the housing, it will always have the same external dimensions within one series, and this will facilitate production as well. In addition, it is also possible to change an existing transmission over to a different transmission ratio. For this purpose, the first main transmission stage is simply removed as a modular unit and replaced by a main transmission stage having a different transmission ratio of an appropriate kind.

In accordance with an advantageous embodiment, the at least one shaft and the gears of the gear/shaft carrier may not laterally project beyond the maximum cross-section of the gear/shaft carrier cut at right angles to a main axis of said gear/shaft carrier. This means that the external dimensions of this modular unit are predetermined by the gear/shaft carrier, and that said gear/shaft carrier also predetermines the position within the housing. All the moving parts are then arranged within the above-mentioned cross-section, whereby also a certain protecting function is given, said protecting function being important especially during the assembly operation.

In accordance with a preferred embodiment, the gear/shaft carrier is cylindrical in shape and the reception bore has a complementary shape. Cylindrical parts are particularly easy to produce and they have the special advantage that they are symmetrical with regard to an axis of rotation, whereby high dimensional accuracy is obtained. The outer contour of the gear/shaft carrier serves so to speak as a guiding and positioning aid in the reception bore.

According to a further embodiment, it is also possible that the axis of the at least one shaft is arranged on a reference circle which is eccentric with regard to the axis of the gear/shaft carrier. This results in an adjustable tooth backlash, since the gears associated with the input and with the output move on an eccentric path when the gear/shaft carrier is being rotated and since the backlash of said gears relative to an output gear can therefore be adjusted.

In accordance with a special embodiment, the axes of the shafts and of the gears of the gear/shaft carrier can be arranged axially parallel to the main axis of the gear/shaft carrier. This provides, among other advantages, also special advantages in the field of production technology, since the bearing seats of the shafts can be produced at one sitting and are exactly in alignment with the main axis. Especially in the case of the embodiment where the gear/shaft carrier is cylindrical in shape, an extremely high accuracy will then exist between the outer surface of the gear/shaft carrier and the axes of the individual shafts and gears, respectively. In addition, the gear/shaft carrier can be implemented as an integral component. This results in additional advantages in the field of production technology, since all the surfaces which are important for a high dimensional accuracy of the gear/shaft carrier can be produced at one sitting; no additional joints, which would again entail certain tolerances, are required for the gear/shaft carrier. On the basis of this structural design, the inventor was able to use straight teeth of the gears, without any necessity of providing crowned gears for the purpose of tolerance compensation. An extremely small backlash can be achieved in this way, said backlash being in the range of 5 angular minutes for the whole transmission unit.

In accordance with an advantageous embodiment, the gear/shaft carrier can comprise at least one cylindrical outer surface area which is received in at least one area of the reception bore in a closely fitting manner. Due to the reduction in size of the mating areas, the gear/shaft carrier as well as the reception bore can be produced more easily; this does, however, not result in any loss of dimensional accuracy.

According to an advantageous embodiment, two cylindrical outer surface areas can be provided, each of said outer surface areas being arranged adjacent to one of the circular end faces of the gear/shaft carrier. This structural design guarantees an alignment of the gear/shaft carrier throughout its whole length, without any risk of inserting said gear/shaft carrier in the reception bore in a tilted condition.

Like an outwardly open housing, the gear/shaft carrier can be constructed such that it is provided with radially extending reception pockets which are accessible from the side and which are used for receiving therein the gears and portions of the at least one shaft. These pockets also offer the possibility of inserting the shafts and gears from the side. This is normally possible because, as long as they do not yet accommodate any bearings, the bearing seats are in most cases sufficiently large for permitting this assembly operation. In addition, the reception pockets prevent the lubricant, e.g. grease, from being flung away, the lubricant remaining in close vicinity of the gears for this reason. On the basis of this structural design, the gear/shaft carrier can still be implemented as an integral component in the case of a further variant.

A simple assembly operation is especially given when, in accordance with one embodiment, the bearing seats and the bearings of the shafts are arranged in the respective end face areas of the gear/shaft carrier. This also offers the possibility of subsequently inserting the bearings from outside, after having inserted and positioned the shafts and gears in the gear/shaft carrier.

In this connection, it will be advantageous when, in accordance with a further embodiment, at least one bearing seat of each shaft of the gear/shaft carrier is implemented such that, at least during the assembly operation, the associated bearing can be inserted axially from the end face. In accordance with an advantageous embodiment, the bearings can also be fixed by means which are adapted to be inserted into the bearing seats from the end faces of the gear/shaft carrier. On the basis of this structural design, the shafts with the gears are also submodules of the modular first main transmission stage and, consequently, they are arranged in the gear/shaft carrier such that they can be replaced at any time. The actual fixing within the carrier is effected by inserting the bearings and by fixing them with the aid of appropriate means.

In accordance with an advantageous embodiment, a plurality of parallel reception pockets can be provided in the gear/shaft carrier, depending on the number of speed steps within the first main transmission stage. For this purpose, said first main transmission stage has an appropriate pocket structure, which is adapted to the possible transmission arrangements to be inserted.

It turned out that, according to a further embodiment, a sufficiently high number of transmission possibilities can be achieved with the highest possible precision. For this purpose, the shafts of the gear/shaft carrier are arranged on the same reference circle around the main axis in displaced relationship with one another. The bearing seats of the shafts can therefore be produced by means of the same tool, simply by rotating the carrier about its main axis. The highest degree of accuracy will be achieved in this way.

In addition, it turned out that, in accordance with one embodiment, the vibrations produced by the first main transmission stage can be damped very effectively in that each of the cylindrical outer surface areas of the gear/shaft carrier has arranged therein at least one circumferentially extending annular groove having inserted therein a ring, preferably a ring consisting of plastic material.

In accordance with a preferred embodiment, the ring or the rings at the first outer surface area of the gear/shaft carrier facing the transmission output can be an O-ring or O-rings pressing against the inner wall of the reception bore of the housing. The rings act as a vibration damper and reduce the amount of noise produced by the transmission unit.

In accordance with an advantageous embodiment, a joinder plane of the housing extending at right angles to the main axis can be provided in the area of an annular groove at the second outer surface area constituting part of the gear/shaft carrier and facing the transmission input, in such a way that the ring is arranged in this plane and the second outer surface area is arranged on both sides of said joinder plane. This embodiment provides two advantages. On the one hand, the ring acts simultaneously as a sealing between the two housing halves in the joinder plane, and, on the other hand, the outer surface area projecting beyond the joinder plane serves as a centering means for attaching the housing component to be mounted. The joinder plane is to be seen as an interface which permits a great variety of attachments, e.g. a reduction gearing or an auxiliary gearbox, to be mounted. This permits a more variable structural design of the transmission unit.

In order to achieve a sufficient sealing effect and in order to obtain also a defined axial pretension of the first main transmission area, a center line of the annular groove can be arranged such that it is displaced relative to the joinder plane of the housing in the direction of the transmission input in such a way that the ring pretensions the gear/shaft carrier in the direction of the transmission output. This results in tilting of the ring due to the relative displacement between the joinder plane and the annular groove, whereby the desired pretension is obtained. A special ring which will resist these stresses is required for this purpose.

In accordance with an advantageous embodiment, an annular groove can be provided in the area of the joinder plane of the housing for positioning the ring on said housing, said annular groove being displaced relative to the annular groove in the outer surface area of the gear/shaft carrier. The ring is thus safely accommodated in an annular groove also in the area of the joinder plane; this also results in a defined amount of squeezing of the ring due to the displacement.

According to one embodiment, the housing can comprise a pot-shaped main area and a connecting flange and/or an attachment, which are joined in the joinder plane, said connecting flange or said attachment fitting closely on part of the outer surface area of the gear/shaft carrier. Hence, there is the possibility of arranging connecting flanges of different types on the pot-shaped main area, and on the basis of an appropriate structural design of the connecting flange it will also be possible to attach different drive means, e.g. electric motors. In view of the fact that the connecting flange fits closely on part of the outer surface area, an exact alignment is obtained between said connecting flange and the pot-shaped main area. In addition, there is the possibility of attaching a reduction gearing or auxiliary gearbox to the joinder plane, the connecting flange being then attached to the input of said reduction gearing or auxiliary gearbox. According to a modular principle, a great variety of different attachments can here be arranged on the joinder plane which is implemented as an interface.

In accordance with an advantageous embodiment, the connecting flange can have rotatably arranged therein a clamping hub as a transmission input for connection with a drive motor, said clamping hub having an extension which extends through an inlet opening in one end face of the gear/shaft carrier into a first reception pocket and which is provided with an input gear, said input gear being in mesh with a first gear of a first shaft of the main transmission stage. It follows that the connecting flange also fulfills the function of introducing the torque into the first transmission stage in that a clamping hub is provided for specific diameters of motors. These motors need not be provided with a suitable gear. The force transmission is effected in a simple manner through an opening in the end face. This inlet opening can be arranged concentrically with the main axis in an advantageous manner. This will again result in high dimensional accuracy.

When the transmission unit is in operation, the transmission components and, consequently, also the air trapped in the transmission unit will warm up. This will result in an over-pressure which builds up in the interior of the transmission and which may have the effect that the lubricant is squeezed out. In order to avoid this, a further embodiment is provided with the feature that the housing has provided therein a compensation chamber with a compressible hollow body for pressure compensation. This compressible hollow body is compressed by the pressure building up and causes an increase in size of the interior volume of the transmission unit, whereby a corresponding pressure compensation will take place.

The compensation chamber and the hollow body can be arranged in the connecting flange. In this way, the structural design of the replaceable first main transmission stage is not rendered unnecessarily complicated.

Pressure compensation is achieved in a simple manner on the basis of the fact that, according to one embodiment, the compensation chamber is implemented as an annular recess which is open towards the first main transmission stage. The hollow body can preferably be provided with a vent means for venting to the outer side of the housing.

A further development of the transmission unit is so conceived that in a last reception pocket of the gear/shaft carrier, which is arranged directly adjacent the end face area facing the transmission output, an internal output gear is arranged, which is provided on an intermediate output shaft extending through an output opening in the end face of the gear/shaft carrier. The output opening can be arranged concentrically with the main axis in an advantageous manner. Also on the output side, the torque is transmitted through an opening in the end face of the first main transmission stage. This guarantees that the pluggability of the modular construction of the transmission unit is preserved.

For reliably holding the intermediate output shaft, an extension, which is adjustable with regard to its projecting length, can be arranged concentrically with the main axis in a wall area of the reception pocket which intersects the main axis and which is located opposite the output opening, said extension engaging an opening of the intermediate output shaft. An easily accessible wall area within the first main transmission stage is now used for producing an extension which, when adjusted in an appropriate manner, permits mounting of the intermediate output shaft on the one hand and prevents unintentional falling out of said intermediate output shaft on the other. Outside of the gear/shaft carrier, an external output gear can be provided on the intermediate output shaft; said external output gear can be provided for engagement with the second main transmission stage. In particular the combination between the adjustable extension, the internal output gear and the external output gear prevents the intermediate output shaft from slipping out of the first main transmission stage unintentionally, when said first main transmission stage has been removed from the housing.

In addition, a centering and support bearing can be arranged, adjacent the end face, on the intermediate output shaft outside of the gear/shaft carrier. The intermediate output shaft can thus be supported directly adjacent the first main transmission stage.

In accordance with a further embodiment, the output opening is implemented as an elongated hole which is open towards the first outer surface area and the width of which is smaller than the diameter of the internal output gear and of the centering and support bearing or of the external output gear, said width being sufficiently large to permit the intermediate output shaft with attachments to be laterally inserted during the assembly operation. This concept results in a very easy insertion of the intermediate output shaft, since said intermediate output shaft is simply inserted from the side. The subsequent centering is effected by means of the bearing attached to said intermediate output shaft. In connection with the adjustable extension, means preventing the intermediate output shaft from falling out can be provided.

According to a further variant, it will be advantageous that the second main transmission stage is a planetary gearing, the external output gear of the first main transmission stage defining the sun gear. Depending on the structural design of the planetary gearing, the external output gear can then be centered by the planetary gears, whereby alignment is caused once more. The planetary gearing then provides a further specific transmission ratio, the transmission ratio being, however, normally not changed within one series.

A further advantageous step towards an improvement of the centering of the components relative to one another is to be seen in the feature that the outer circumference of the centering and support bearing is received in a bearing seat of a planet carrier of the second main transmission stage. This has also the effect that the two main transmission stages are brought into alignment with one another.

In addition, a bearing seat can be arranged on the end of the intermediate output shaft facing away from the transmission input, said bearing seat being introduced in a support bearing in the planet carrier. The intermediate output shaft is in this way supported and guided at several points of the second main transmission stage. Higher torques can be taken up by this structural design.

In accordance with an advantageous embodiment, the second main transmission stage can be provided with an internal ring gear which is arranged in a recess of the reception bore such that it is secured against rotation relative thereto. This permits the housing seats for the second main transmission stage and the first main transmission stage to be produced at one sitting.

In order to arrange also the second main transmission stage such that a damping effect exists relative to the housing, a resilient ring, preferably a ring consisting of plastic material, can be inserted in at least in an area between said internal ring gear and the reception bore of the housing.

In accordance with one embodiment, a protection against rotational displacement with overload protection for the associated main transmission stage can be achieved by structurally particularly simple means in that the rings of said first main transmission stage and/or the resilient ring of said second main transmission stage permit slipping of the gear/shaft carrier or of the internal ring gear from a specific torque onwards. By means of rings having an appropriate shape and the pressure exerted by said rings towards the interior of the housing, the associated overload value can be adjusted within comparatively narrow limits.

The main transmission stages can mutually secure themselves in position. In accordance with one variant, this is achieved in that a roller bearing comprising an inner and an outer race is arranged between the internal ring gear and the planet carrier, and that an annular web, which is pressed onto the stationary race of the roller bearing, is arranged on one end face of the gear/shaft carrier. It follows that the annular web of the first main transmission stage secures a component of the second main transmission stage in position. In particular, in connection with the axial pretension, the force with which the annular web is pressed onto the race can be adjusted precisely. In addition, the planet carrier can be provided with an extension projecting beyond the housing and defining an output shaft.

In order to provide a transmission which can be produced as easily as possible and at the lowest possible price, the housing can preferably be produced from aluminum. In this connection, e.g. aluminum die casting can be used very well.

BRIEF DESCRIPTION OF THE DRAWINGS

In the following, embodiments of the present invention will be explained in detail on the basis of the drawings, in which:

FIG. 6 shows the first main transmission stage in a perspective exploded view;

DETAILED DESCRIPTION

Figure 1:
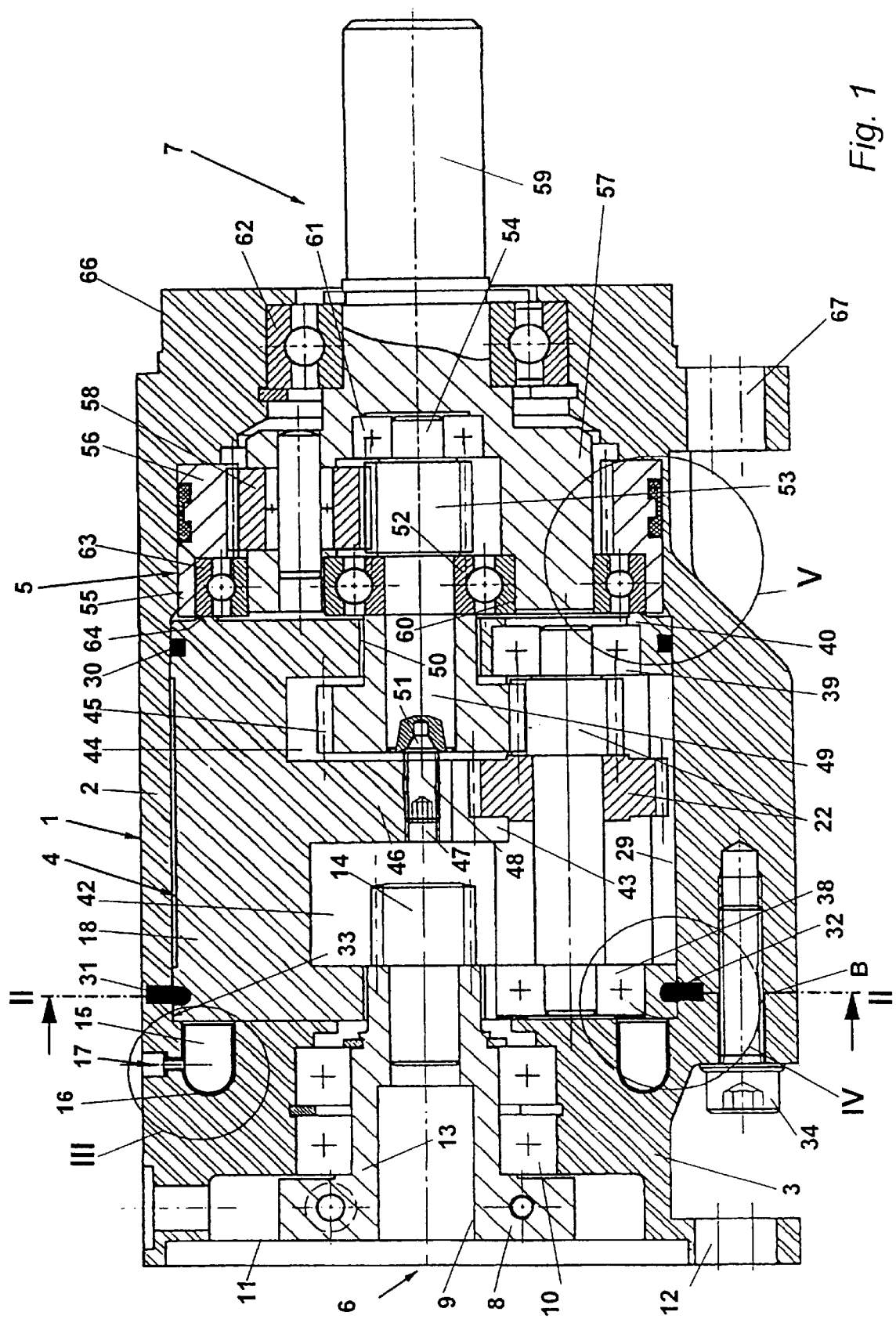
FIG. 1 shows, fully in section, a transmission unit according to the present invention.

The transmission unit shown in FIG. 1 comprises essentially a transmission housing 1 having a pot-shaped main housing area 2 and a connecting flange 3 connected thereto, a first main transmission stage 4 and a second main transmission stage 5. At the connecting flange 3, the transmission input 6 and, on the opposite side of the housing 1, the transmission output 7 are located.

A clamping hub 8 comprising a shaft reception opening 9 is rotatably supported in said connecting flange 3. The clamping hub 8 is supported by means of two parallel bearings 10 in the interior of the connecting flange 3. Suitable centering shoulders 11 and elongated fastening holes 12 serve to connect a drive motor, which is not shown, the shaft of said drive motor being inserted into the shaft reception opening 9 and connected to the clamping hub 8 in the manner known. The clamping hub has a cylindrical extension 13 having attached thereto an input gear 14. The clamping hub 8 and the input gear 14 are each arranged such that they are rotatable coaxially with the main transmission axis A.

Figure 3:
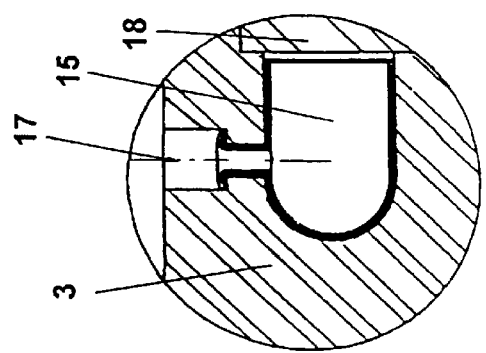
FIG. 3 shows area III of FIG. 1 in an enlarged representation.
Figure 7:
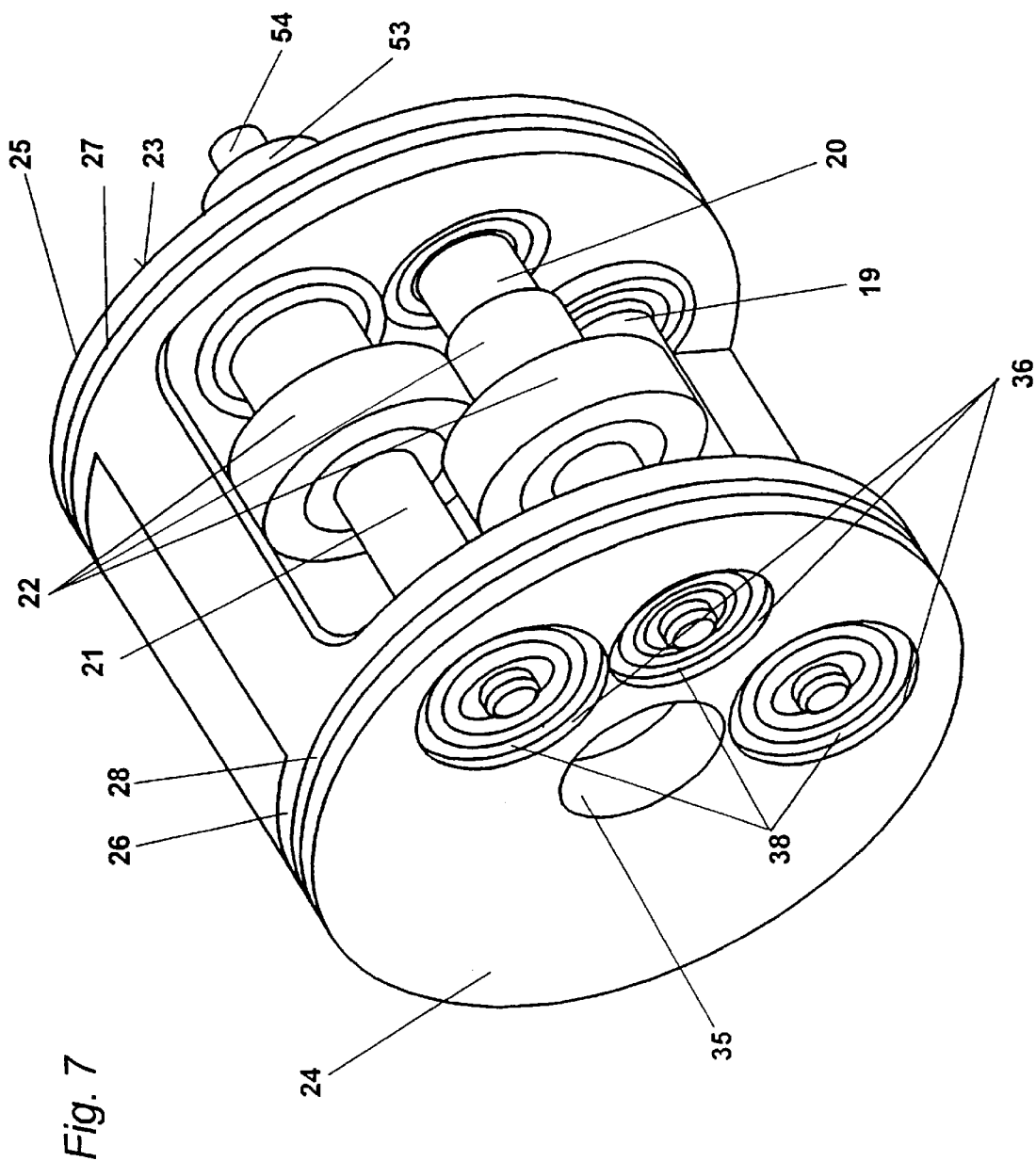
FIG. 7 shows the first main transmission stage in a perspective view, seen from the input side.
Figure 8:
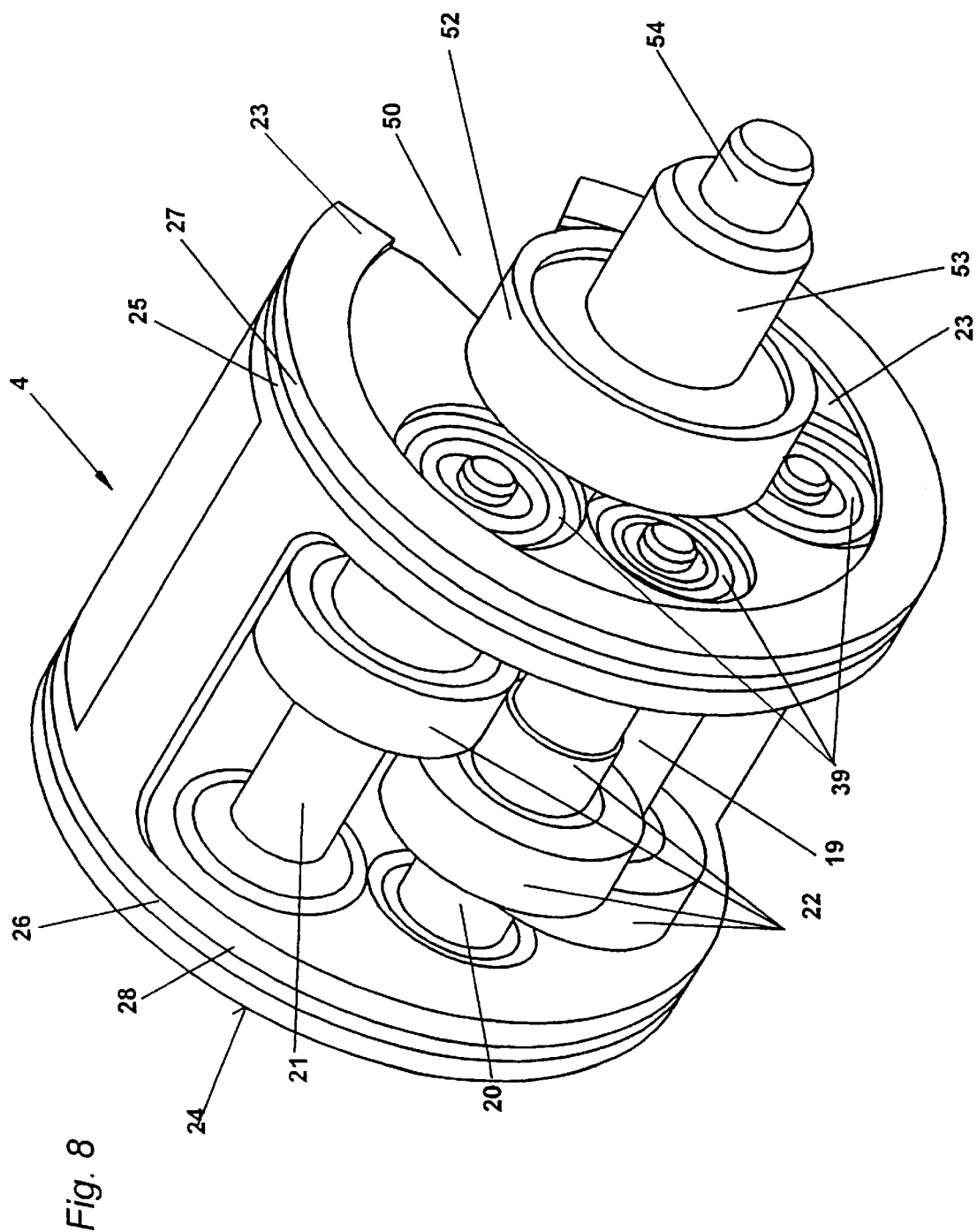
FIG. 8 shows the first main transmission stage of FIG. 7 in a perspective view, seen from the output side.

The end face of the connecting flange 3 facing the main housing area 2 has formed therein an annular groove 15 having inserted therein, in a closely fitting mode of arrangement, a resilient compensation chamber in the form of a compressible hollow ring 16 of plastic material. The hollow ring 16 of plastic material is provided with a vent hole 17 leading to the outer side of the housing 1. The hollow ring 16 of plastic material is implemented such that it will be compressed in response to an increase in pressure in the interior of the housing 1 caused by an increase in temperature and that the air in the interior of said hollow ring will escape through the vent hole 17 in accordance with the compressed volume. Due to the compression of the hollow ring 16 of plastic material, the internal volume of the housing 1 will enlarge so that the excess pressure can decrease (see also FIG. 3).

Figure 4:
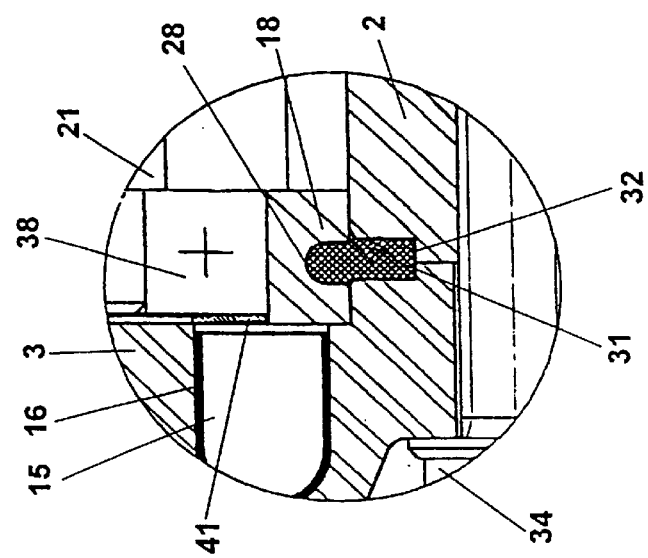
FIG. 4 shows area IV of FIG. 1 in an enlarged representation.

Adjacent the connecting flange 3, the first main transmission stage 4 is arranged in the transmission housing 1. Especially with the aid of FIGS. 2 and 6 to 8, it can be seen that the main transmission stage 4 comprises a one-piece, substantially cylindrical gear/shaft carrier 18 produced from a block, along with shafts 19, 20, 21 and transmission gears 22 which are arranged therein. The gear/shaft carrier 18 has a first substantially circular end face 23 and a second substantially circular end face 24. Both end faces 23, 24 are oriented such that they extend in parallel. The end faces 23 and 24 are followed by respective first and second outer surface areas 25 and 26 corresponding in shape to the outer surfaces of a cylinder. The two outer surface areas 25 and 26 are each provided with a circumferentially extending annular groove 27 and 28, respectively. The two outer surface areas 25 and 26 have a diameter which is slightly larger than that of the rest of the gear/shaft carrier 18 and represent consequently the fitting surfaces used for insertion in the reception bore 29 of the housing 1 (see FIGS. 1 and 4). The annular groove 27 has arranged therein an O-ring 30 which is firmly pressed against the inner wall of the reception bore 29. The annular groove 28 has inserted therein a specially shaped plastic ring 31. In addition, the annular groove 28 has associated therewith an outer annular groove 32 in the housing 1 which is arranged such that it is displaced towards the transmission output 7 so that the plastic ring 31 is formed with an offset portion which pretensions the first main transmission stage 4 towards the transmission output 7. The outer annular groove 32 is located precisely in the joinder plane B between the connecting flange 3 and the main housing area 2 so that each of these two components 3 and 2 has formed therein a corresponding recess for defining the outer annular groove 32. In addition, the second outer surface area 26 extends beyond the end of the main housing area 2 in the direction of the transmission input 6 so that a centering opening 33 of the connecting flange 3 is pushed, in a closely fitting mode of arrangement, onto the second outer surface area 26. The connecting flange 3 is secured to the main housing area 2 with the aid of screws 34.

The second end face 24 of the gear/shaft carrier 18 has provided therein an inlet opening 35 which is arranged coaxially with the main axis A and through which the extension 13 of the clamping hub 8 extends such that it is adapted to be rotated and through which also the input gear 14 can be passed. The centers of the cylindrical bearing seat openings 36 are arranged on the same reference circle coaxially with the main axis A. The bearing seat openings 36 of the end face 24 are in alignment with associated bearing seat openings 37 which are open towards the first end face 23. Each of the shafts 19, 20, 21 is provided with a rolling element bearing 38 and 39, respectively, which are arranged at opposite ends of the respective shaft and which are inserted in the bearing seat openings 36 and 37 in an appropriate manner. The rolling element bearings 39 abut on a shoulder 40 in the bearing seat opening 37. The rolling element bearings 38 are held in the bearing seat openings 36 by a spring element 41 having a special structural design. However, it is definitely also possible to fasten the rolling element bearings 38 and 39 to both bearing seat openings 36 and 37 by means of additional components, such as the spring element 41.

Figure 2:
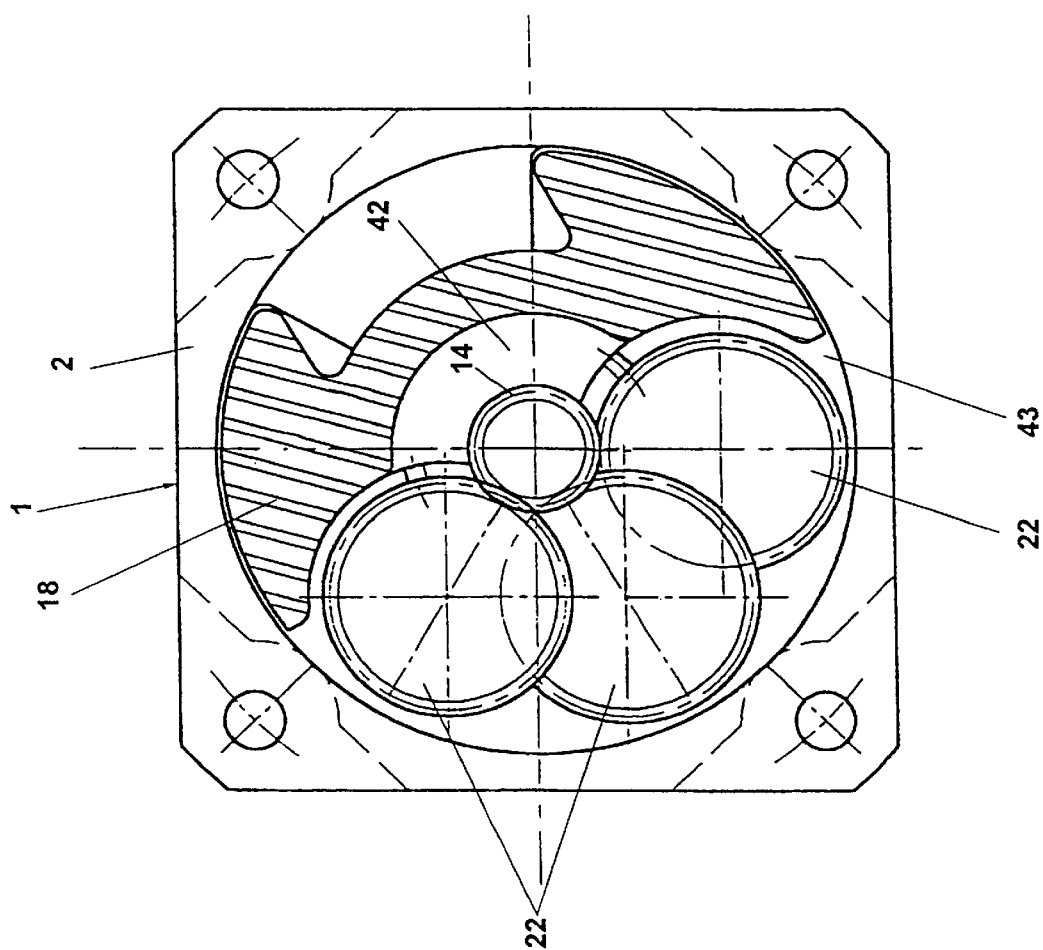
FIG. 2 shows the unit according to FIG. 1 cut along line II—II.

The shafts 19, 20, 21 and the transmission gears 22 are arranged within the gear/shaft carrier in appropriately formed, radially accessible reception pockets 42, 43 and 44. (See. FIG. 2) It is also possible to provide a higher or a lower number of reception pockets. In this connection, it is important that the reception pockets 42, 43 and 44 define an opening towards the circumferential surface of the gear/shaft carrier 18 which is large enough to permit insertion of the shafts 19, 10, 21 and of the gears 22, the rolling element bearings 38 being subsequently inserted from the end face 24 and secured in position by the spring element 41.

Each shaft 19, 20, 21 has arranged thereon two transmission gears 22, each of said transmission gears engaging a respective transmission gear 22 of another shaft 19, 20 or 21, the input gear 14 or an internal output gear 45. Due to the use of different transmission gears 22 and of different numbers of shafts 19, 20 or 21, it is possible to achieve a great variety of transmission ratios between the input gear 14 and the internal output gear 45. Due to the fact that the shafts 19, 20, 21 with the gears 22 and the bearings 38 and 39 can also be exchanged in a modular construction mode, the shape of the gear/shaft carrier 18 can remain the same within one series in spite of different transmission ratios. The arrangement of the shafts 19, 20, 21 and transmission gears 22 within the gear/shaft carrier 18 is therefore freely selectable as long as a reliable engagement with the input gear 14 and the internal output gear 45 is guaranteed. A tapped hole 47 with a screwed-in threaded pin 48 is provided in the intermediate wall 46 defining the reception pocket 43. The tapped hole 47 is oriented coaxially with the main axis A and the threaded pin 48 is screwed into said tapped hole in such a way that it projects into the reception pocket 44. The internal output gear 45 is pressed onto an intermediate output shaft 49, which is also arranged coaxially with the main axis A. The intermediate output shaft 49 extends through the output opening 50 in the first end face 23 of the gear/shaft carrier 18. In addition, the end face of the intermediate output shaft 49 is provided with a center hole 51 which is partially engaged by the threaded pin 48. The threaded pin 48 is screwed in only to such an extent that the intermediate output shaft 49 can rotate freely, but that said intermediate output shaft 49 and the components attached thereto will be prevented from falling out in the disassembled state. This is particularly important in view of the fact that the output opening 50 is implemented as an elongated hole and is open towards the first outer surface area 25 so that this outer surface area is interrupted at the point in question. Adjacent to the end face 23, the intermediate output shaft 49 is provided with a centering and support bearing 52 and, adjacent to said centering and support bearing 52, with an external output gear 53 as well as a cylindrical bearing seat stub 54. When the threaded pin 48 has been screwed back far enough, the intermediate output shaft 49 and all the components attached thereto can laterally be pushed out of the output opening 50. For this purpose, the opening direction of the output opening 50 is oriented in a direction precisely opposite to the group of bearing seat openings 37.

The second main transmission stage 5 adjoining the first main transmission stage 4 is a planetary gearing comprising an internal ring gear 56, which is arranged in a recess 55 of the reception bore 29, and a planet carrier 57 which is provided with an extension implemented as an output shaft 59 and extending from the inner side of the housing 1 to the outer side thereof, three uniformly distributed planetary gears 58 being rotatably supported in said plant carrier 57. The output shaft 59 is oriented coaxially with the main shaft A.

The centering and support bearing 52 of the intermediate output shaft 49 is arranged in a center hole 60 of the planet carrier 57. The external output gear 53 is centrally inserted between the planetary gears 58 as a sun gear and drives these planetary gears 58. The bearing seat stub 54 is received by a support bearing 61 in the planet carrier 57. The planet carrier 57 itself is rotatably supported by the roller bearing 62 in the area of the output shaft 59 and by the roller bearing 63 in the area of the internal ring gear 56. The outer race of the roller bearing 63 is held by an almost circumferentially extending annular web 64 on the end face 23 of the gear/shaft carrier 18.

Figure 5:
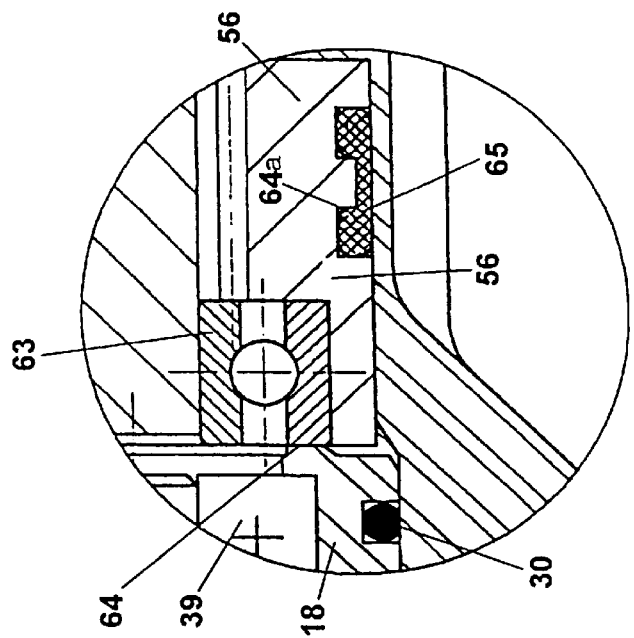
FIG. 5 shows area V of FIG. 1 in an enlarged representation.

In particular on the basis of FIG. 5, it can be seen that the outer circumferential surface of the internal ring gear 56 has provided therein a specially formed annular groove 64*a* in which a resilient plastic ring 65 is arranged, said plastic ring 65 being adapted to the contour of said annular groove 64*a*. The resilient plastic ring 65 provides a suitable amount of pretension relative to the recess 55 so that the internal ring gear 56 is held in the housing 1 such that it is secured against rotation relative thereto. The resilient ring 65 can also be used as an overload protection in that the internal ring gear 56 slips through when a specific torque is exceeded. Also vibrations are absorbed by said resilient plastic ring 65.

On the transmission output side 7, the housing 1 has a cylindrical centering shoulder 66 and fastening holes 67 for arranging components to be driven, said components being driven by the output shaft 59.

In the following, the mode of operation of the above-mentioned embodiment will be explained in detail.

The first main transmission stage 4 as well as the second main transmission stage 5 are inserted in the main housing area 2 as modular units. The roller bearing 62 is inserted first, whereupon the second main transmission stage 5 is inserted such that the output shaft 59 projects on the transmission output side 7, the connecting flange 3 being detached during these inserting operations. The resilient plastic ring 65 guarantees that the internal ring gear 56 is sufficiently secured against rotation relative to the main housing area 2. Retainer rings, which are not designated by separate reference numerals, and an appropriate stop step in the main housing area 2 guarantee axial positioning of the second main transmission stage 5.

Following this, the first main transmission stage 4 is inserted into the main housing area 2 with the external output gear 53 foremost. The support bearing 61 in the second main transmission stage 5 and the centering and support bearing 52 guarantee that the intermediate output shaft 49 is precisely centered and supported. In the present example, three planetary gears 58, which are displaced relative to one another by 120°, are provided in the second main transmission stage 5 so that a uniformly distributed transmission of force is also effected by the external output gear 53.

Finally, the plastic ring 31 is inserted and the centering opening 33 of the connecting flange 3 is pushed onto the projecting part of the second outer surface area 26. The screws 34 then provide a firm connection and the deformation of the plastic ring 31 provides the necessary pretension of the first main transmission stage 4 so that the annular web 64 is pressed onto the outer race of the roller bearing 63 of the second main transmission stage 5, said plastic ring 31 also covering the housing halves.

By means of the clamping hub 8 and the elongated fastening holes 12, a drive motor can be connected to the transmission via the centering shoulder 11. On the transmission output side 7, the torque can then correspondingly be transmitted via the output shaft 59 to a unit to be driven.

In this connection, it is important to point out that in particular the first main transmission stage 4 can be completely exchanged as a modular unit. Also the shafts 19, 20, 21 and the transmission gears 22 can be exchanged very easily. Due to the fact that the gear/shaft carrier is implemented as an integral, cylindrical component, all the measures which are important with regard to dimensional accuracy can be produced at one sitting. This has considerable advantages with regard to the maximum admissible amount of backlash of such a transmission. The structural design of the above-mentioned gear/shaft carrier permits the transmission gears 22 to have straight teeth of extremely high precision, since, due to the predeterminable tolerances, inadmissible pressure on the tooth profile resulting from angular inaccuracies can be excluded.

The modular structural design of the transmission unit described makes it possible that, especially within one series, not more than a single main housing area 2, a single connecting flange 3 and, if desired, a single second main transmission stage 5 are required. For providing the various transmission ratios within one series, it is only necessary to replace the first main transmission stage 4 in a modular way by another main transmission stage having a similar structural design. In the most advantageous case, it will suffice to produce different shafts 19, 20, 21 and transmission gears 22 for providing the desired transmission ratios. All the other components can be used in identical form. It is therefore easily understandable that a transmission unit having this type of structural design can be changed over from one transmission ratio to the next within much shorter time. The terms of delivery for such transmissions can therefore be reduced substantially.

What is claimed is:

1. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier having a longitudinal main axis, the gear/shaft carrier provided with at least one shaft and at least two gears, and the thus defined first main transmission stage is replaceably insertable in a reception bore of the housing as a modular unit.

2. A transmission unit according to claim 1, wherein the at least one shaft and the gears of the gear/shaft carrier do not laterally project beyond a maximum cross-section of the gear/shaft carrier as defined at right angles to the main axis of the gear/shaft carrier.

3. A transmission unit according to claim 1, wherein the gear/shaft carrier is cylindrical in shape and the reception bore has a complementary shape.

4. A transmission unit according to claim 1, wherein the axis of the at least one shaft is located on a reference circle which is eccentric with regard to the main axis of the gear/shaft carrier.

5. A transmission unit according to claim 1, wherein the axes of the shafts and of the gears of the gear/shaft carrier are axially parallel to the main axis of the gear/shaft carrier.

6. A transmission unit according to claim 1, wherein the gear/shaft carrier is an integral component.

7. A transmission unit according to claim 1, wherein the gear/shaft carrier is provided with radially extending reception pockets which are accessible from the side and which are used for receiving therein the gears and portions of said at least one shaft.

8. A transmission unit according to claim 1, wherein depending on the number of speed steps within the first main transmission stage, a plurality of parallel reception pockets is provided in the gear/shaft carrier.

9. A transmission unit according to claim 1, wherein the shafts of the gear/shaft carrier are located on the same reference circle around the main axis, in angularly displaced relationship with one another.

10. A transmission unit according to claim 1, wherein the housing is produced from aluminum.

11. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage is replaceably insertable in a reception bore of the housing as a modular unit, wherein the gear/shaft carrier comprises two circular end faces and at least one cylindrical outer surface area which is received in at least one area of the reception bore in a closely fitting manner.

12. A transmission unit according to claim 11, wherein the housing comprises a pot-shaped main area and a connecting flange and/or an attachment, which are joined at a joinder plane, said connecting flange or said attachment fitting closely on a part of said at least one outer surface area of the gear/shaft carrier.

13. A transmission unit according to claim 12, wherein the gear/shaft carrier further comprises radially extending reception pockets which are accessible from the side and which are used for receiving therein the gears and portions of said at least one shaft; and the connecting flange has rotatably arranged therein a clamping hub as a transmission input for connection with a drive motor, said clamping hub having an extension which extends through an inlet opening in one end face of the gear/shaft carrier into a first reception pocket and which is provided with an input gear, said input gear being in mesh with a first gear of a first shaft of the first main transmission stage.

14. A transmission unit according to claim 13, wherein the inlet opening is concentric with the main axis of the gear/shaft carrier.

15. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage is replaceably insertable in a reception bore of the housing as a modular unit, wherein the gear/shaft carrier comprises two circular end faces and two cylindrical outer surface areas, each of said outer surface areas being located adjacent to one of the circular end faces.

16. A transmission unit according to claim 15, wherein each of the cylindrical outer surface areas of the gear/shaft carrier has located thereon at least one circumferentially extending annular groove, each groove having inserted therein a ring.

17. A transmission unit according to claim 16, wherein the rings are O-rings pressing against an inner wall of the reception bore of the housing.

18. A transmission unit according to claim 16, wherein further the rings provide protection against rotational displacement with overload protection for the main transmission stage associated therewith.

19. A transmission unit according to claim 16, wherein a joinder plane of the housing extending at right angles to the main axis of the gear/shaft carrier is provided in the area of the annular groove in the second outer surface area constituting part of the gear/shaft carrier and facing the transmission input, such that the ring inserted in the annular groove in the second outer surface area is located in the joinder plane, and the second outer surface area is arranged on both sides of said joinder plane.

20. A transmission unit according to claim 19, wherein the annular groove is displaced relative to the joinder plane of the housing, in the direction of the transmission input, such that the ring pretensions the gear/shaft carrier in the direction of the transmission output.

21. A transmission unit according to claim 19, wherein an annular groove is provided in the area of the joinder plane of the housing for positioning the ring on said housing, said annular groove being displaced relative to the annular groove in the outer surface area of the gear/shaft carrier.

22. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with circular end faces, at least one shaft and at least two gears, and the thus defined first main transmission stage is replaceably insertable in a reception bore of the housing as a modular unit, wherein each of the shafts are provided with bearing seats and bearings, the bearing seats and bearings of the shafts being located in the respective end face areas of the gear/shaft carrier.

23. A transmission unit according to claim 22, wherein at least one bearing seat of each shaft is implemented such that, at least during the assembly operation, the associated bearing can be inserted axially from an end face.

24. A transmission unit according to claim 22, further comprising means for retaining the bearings, said retaining means adapted to be inserted into the bearing seats from the end faces of the gear/shaft carrier.

25. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage is replaceably insertable in a reception bore of the housing as a modular unit, wherein the housing has provided therein a compensation chamber with a compressible hollow body for pressure compensation.

26. A transmission unit according to claim 25, wherein the hollow body is provided with a vent means leading to the outer side of the housing.

27. A transmission unit according to claim 25, wherein housing further comprises a connecting flange, and the compensation chamber and the hollow body are located in the connecting flange.

28. A transmission unit according to claim 27, wherein the compensation chamber is an annular recess which is open towards the first main transmission stage.

29. A transmission unit comprising a transmission input, a transmission output, at least one first main transmission stage and a second main transmission stage connected in series therewith, and a housing encompassing said first and second main transmission stages in common, at least said first main transmission stage being defined by a gear/shaft carrier provided with at least one shaft and at least two gears, and the thus defined first main transmission stage is replaceably insertable in a reception bore of the housing as a modular unit, wherein the gear/shaft carrier comprises a longitudinal main axis, two circular end faces, and radially extending reception pockets which are accessible from the side and which are used for receiving therein the gears and portions of said at least one shaft, and wherein further an internal output gear is located in a last reception pocket of the gear/shaft carrier, which is located directly adjacent the end face area facing the transmission output, said output gear provided on an intermediate output shaft extending through an output opening in an end face of the gear/shaft carrier.

30. A transmission unit according to claim 29, wherein the output opening is concentric with the main axis of the gear/shaft carrier.

31. A transmission unit according to claim 29, wherein the axis of said at least one shaft is located on a reference circle which is eccentric with regard to the axis of the input gear and/or to the axis of the internal output gear.

32. A transmission unit according to claim 29, further comprising an extension arranged concentrically with the main axis of the gear/shaft carrier, the extension associated with a wall area of the reception pocket which intersects the main axis of the gear/shaft carrier and which is opposite the output opening, the projecting length of the extension being adjustable, the extension engaging an opening of the intermediate output shaft.

33. A transmission unit according to claim 29, wherein outside of the gear/shaft carrier, a centering and support bearing is arranged on the intermediate output shaft adjacent the end face.

34. A transmission unit according to claim 29, wherein an external output gear is provided on the intermediate output shaft outside of the gear/shaft carrier.

35. A transmission unit according to claim 34, wherein the output opening is an elongated hole which is open towards a first cylindrical outer surface area of the gear/shaft carrier, the width of the output opening being smaller than the diameter of the internal output gear and of the centering and support bearing or of the external output gear, said width being sufficiently large to permit the intermediate output shaft with attachments to be inserted radially to the main axis during the assembly operation.

36. A transmission unit according to claim 34, wherein the second main transmission stage is a planetary gearing, the external output gear of the first main transmission stage defining the sun gear.

37. A transmission unit according to claim 36, wherein the outer circumference of the centering and support bearing is received in a bearing seat of a planet carrier of the second main transmission stage.

38. A transmission unit according to claim 37, wherein a bearing seat is arranged on the end of the intermediate output shaft facing away from the transmission input, said bearing seat being introduced in a support bearing the planet carrier.

39. A transmission unit according to claim 37, wherein the planet carrier is provided with an extension projecting beyond the housing and defining an output shaft.

40. A transmission unit according to claim 37, wherein the second main transmission stage is provided with an internal ring gear which is located in a recess of the reception bore such that it is secured against rotation relative thereto.

41. A transmission unit according to claim 40, wherein a resilient ring, preferably a ring consisting of plastic material, is inserted at least in an area between said internal ring gear and the reception bore of the housing.

42. A transmission unit according to claim 41, wherein the resilient ring provides protection against rotational displacement with overload protection for the main transmission stage associated therewith.

43. A transmission unit according to claim 40, wherein a roller bearing comprising an inner and an outer race is arranged between the internal ring gear and the planet carrier, and that an annular web, which is pressed onto the stationary race of the roller bearing, is arranged on the end face of the gear/shaft carrier.

* * * * *